Nov. 7, 1967        E. R. CASALE        3,350,958
V-DRIVE TRANSMISSION
Filed Jan. 10, 1966        2 Sheets-Sheet 1
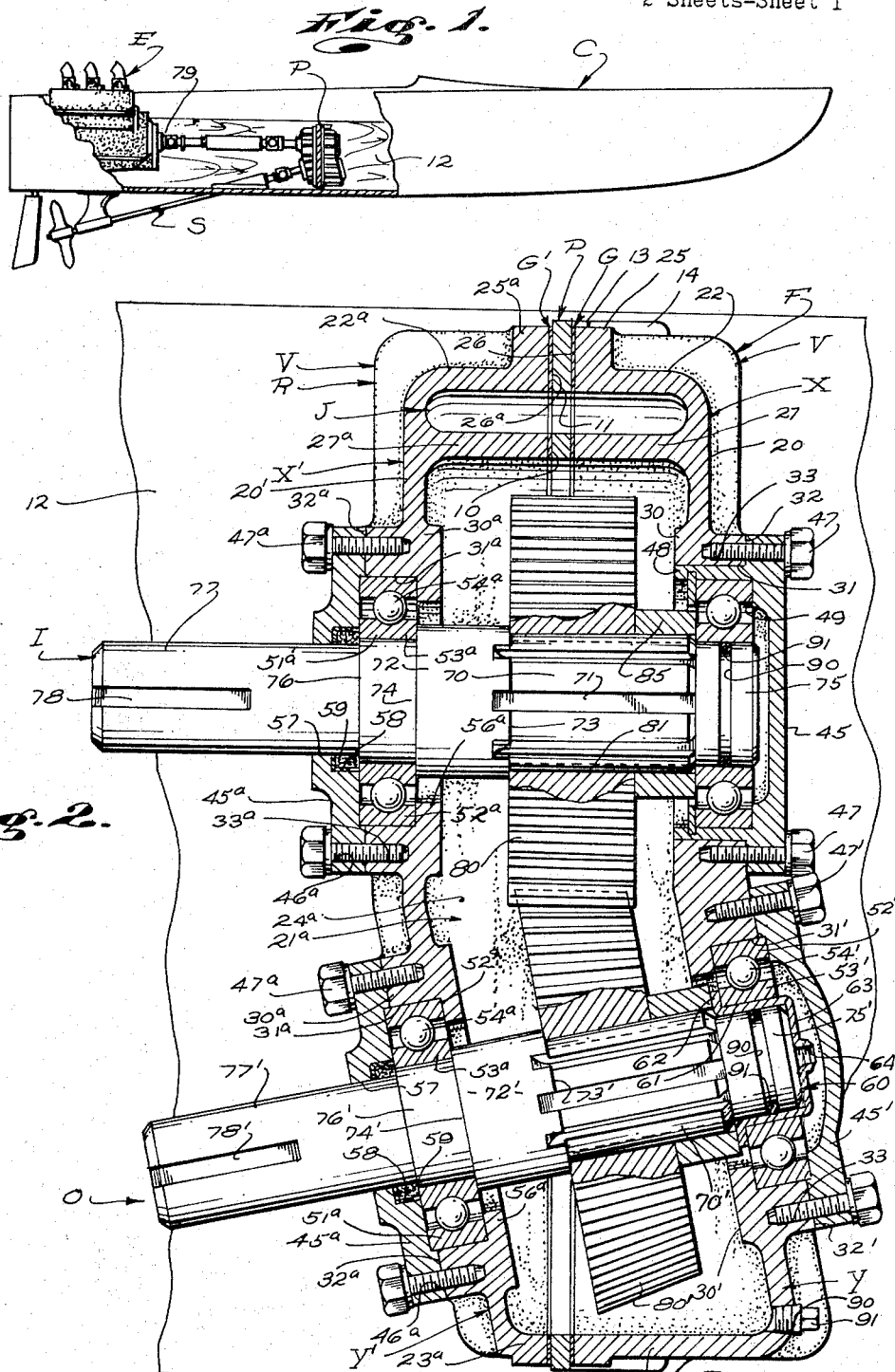
Inventor
Ernest R. Casale
By
George C. Marshall
Attorney

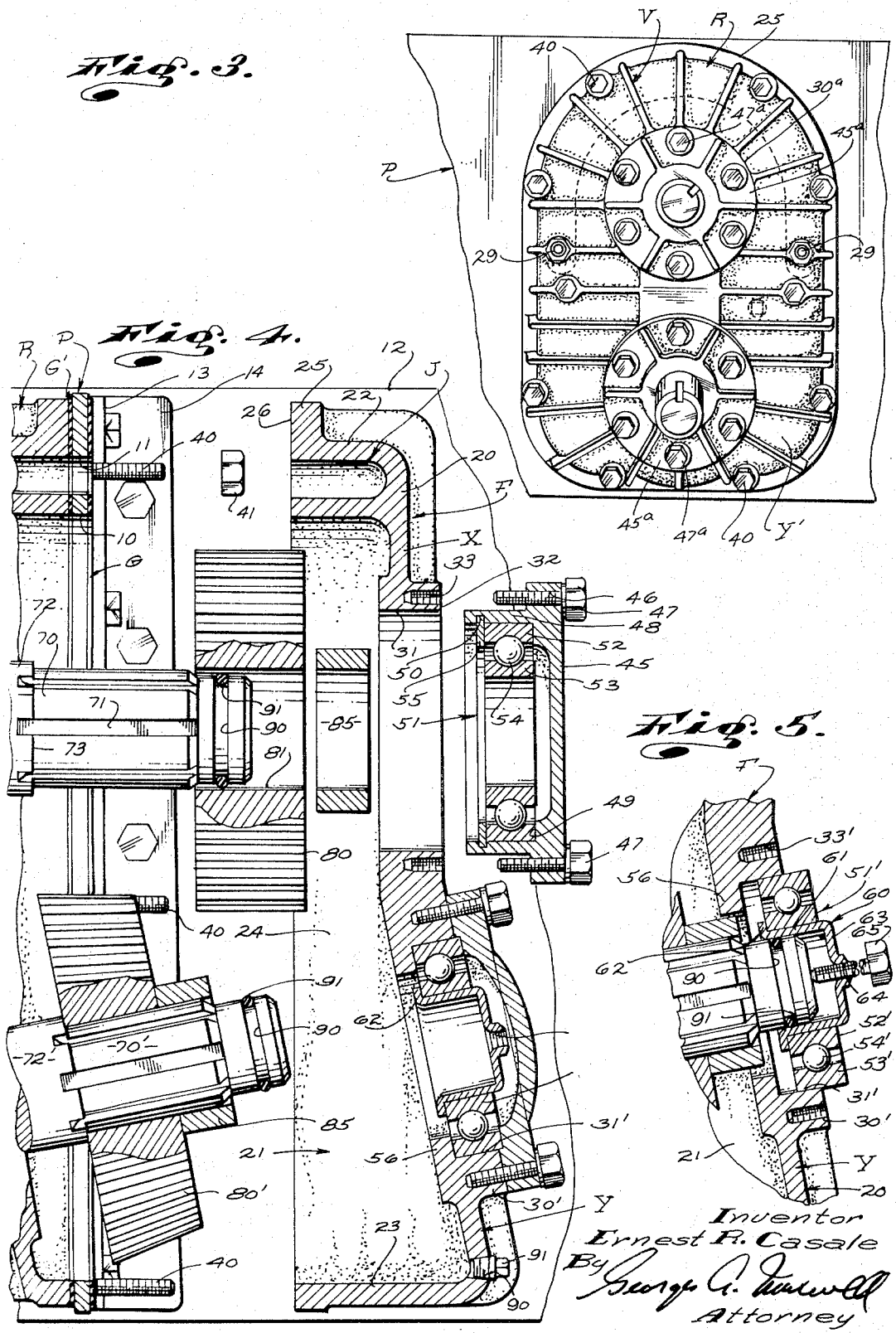

United States Patent Office 3,350,958
Patented Nov. 7, 1967

3,350,958
V-DRIVE TRANSMISSION
Ernest R. Casale, Whittier, Calif.
(161 8th Ave., City of Industry, Calif. 94597)
Filed Jan. 10, 1966, Ser. No. 519,484
10 Claims. (Cl. 74—417)

This invention has to do with a novel marine transmission and is more particularly concerned with a V-drive transmission which is such that the gears can be easily and quickly changed.

In marine architecture and/or design, particularly in high speed or racing craft, it has been found to be extremely desirable and effective to place the prime movers or engines in the rear of such craft, adjacent their transome and above their planning surfaces. The purpose of such arrangement is to achieve a most beneficial placement of mass. In other than high speed or racing craft, it has been found that it is extremely advantageous, from the standpoint of conservation of space, to place the engines in the rear or stern quarters of such craft.

To achieve such a placement of the engines, V-drive transmissions are employed. These transmissions are mounted within their related craft, forward of the engines and have rearwardly projecting, upper, input shafts connected with the drive shafts of the engines and have lower, downwardly and rearwardly inclined, rearwardly projecting output shafts connected with the upper forward ends of the downwardly and rearwardly inclined propeller shafts, which propeller shafts extend rearwardly and downwardly beneath the engines and through suitable stuffing boxes in the bottoms of the craft. The rear ends of the propeller shafts terminate below the bottoms of the craft and are fitted with or carry suitable propellers.

In high performance racing craft and in order to attain maximum performance, adjustments must be made for such factors as: changes or variations in the density of the water in and on which the craft is to be operated, which is controlled by such factors as salinity and temperature of the water; the surface conditions of the water, whether smooth or choppy; the wind conditions; the altitude and its affect on engine output; the fuel and its effect on engine output and a multitude of other such factors.

Such adjustments require changes in the size, shape and/or pitch of the propellers and/or the speeds at which the propellers are rotated or turned.

To effect desired changes in propeller speeds while maintaining maximum and most effective or efficient engine speed, an increase or reduction of the rate of rotation, or the r.p.m.'s between the input and output shafts of a V-drive transmission is required.

Since the ordinary V-drive is a relatively simple structure and involves a drive gear on the input shaft, meshed with a driven gear on the output shaft, changing the relative rotative speeds between the said shafts can be and is commonly effected by changing or substituting matched sets of gears, of varying or different diameters, on said shafts.

While changing the pairs of gears in such transmissions would appear to be a simple matter, such as not ordinarily the case, and in most constructions, requires that the transmissions be dismantled from their related engine drive shafts and propeller shafts and then be completely dismantled.

The difficulty of changing the gears in such transmissions is brought about or largely due to the fact that the input and output shafts are angularly related to each other so that their rear ends, which ends are coupled or connected with the forward ends of their related drive and propeller shafts are divergent and their forward, free ends, at which ends the gears would be accessible, are forwardly convergent, further, both the forward and rear ends of the input shaft and output shaft must be bearing supported.

As a result of the above relationship of parts, the forward bearings, which are necessarily carried in fixed position by a suitable housing structure, cannot be shifted axially forwardly or rearwardly without binding on the shafts. The same is also true of the rear bearings. Accordingly, in the case of the ordinary V-drive transmission, the input and output shafts must be disconnected from the drive and propeller shafts with which they are related and the entire structures must be dismantled in order to effect changing the gears therein.

In the ordinary V-drive transmission, the housing is provided with laterally outwardly projecting, horizontal, axially extending mounting flanges, which flanges rest on and are fixed to a pair of laterally spaced stringer-like portions of a V-drive mounting structure. The mounting structure is, in turn, fixed to structure in the craft, such as the engine stringers. The V-drive mounting means, such as referred to above, whether standard or custom built, are bulky, heavy and costly structures.

An object of my invention is to provide a novel V-drive transmission which is such that the gears thereof can be easily and quickly changed, without disconnecting the input and output shafts from their related drive and propeller shafts and/or without completely dismantling the transmission.

Still another object of the present invention is to provide a transmission having novel mounting means, which means is simpler, lighter, and less costly than ordinary or conventional V-drive mounting means.

It is a feature of the instant invention to provide a V-drive transmission of the character referred to which involves a central, vertical, transversely extending, apertured mounting plate, front and rear shell-like housing sections engaged with a releasably secured to the opposite, front and rear surfaces of the mounting plate, in opposed relationship to each other and in register with the aperture in the plate.

Another feature of my invention is to provide a front housing section of the character referred to having upper and/or lower openings to releasably receive carrier plates in which the front input and/or output shaft bearings are carried.

It is an object of my invention to provide a mounting plate of the character referred to above which serves to mount the transmission in a related craft.

It is yet another object of this invention to provide a structure of the character referred to wherein the carrier plate or plates carried by the front housing section and which carry the forward shaft bearing or bearings can be easily and conveniently loosened, or removed to free the bearing or bearings from their related shafts.

Another object of this invention is to provide a bearing mounting having novel retaining and pulling means related thereto.

It is still another object to provide a transmission of the character referred to which is such that when a bearing related to the front housing section is freed from its related shaft, the front section can be easily and conveniently removed from engagement with the mounting plate so as to expose and provide free access to the shafts and the gears thereon.

The various objects and features of my invention will be fully understood from the following detailed description of a typical preferred form and application of my invention, throughout which description reference is made to the accompanying drawings, in which:

FIG. 1 is a view of a boat or craft with a transmission as provided by the present invention related thereto, portions of the craft being broken away to better illustrate the invention;

FIG. 2 is an enlarged longitudinal sectional view of my new transmission;

FIG. 3 is a front elevational view of my new transmission;

FIG. 4 is a view similar to a portion of the construction shown in FIG. 2 and showing the various parts in an exploded or partially dismantled condition; and, FIG. 5 is a view of a portion of the structure shown in FIG. 4 with parts in another position.

The V-drive transmission provided by the present invention involves generally, an elongate, flat, vertical, transversely extending mounting plate P having front and rear surfaces and having a primary aperture 10 intermediate its ends and a secondary aperture 11 intermediate its ends and above and about the upper portion of the primary aperture. The apertures 10 and 11 open forwardly and rearwardly and are axially disposed.

The plate is of sufficient length or lateral extent to extend between a pair of longitudinally extending motor mounting stringers 12 in the boat or craft C with which the transmission is related, or other suitable structural parts in the craft and which will serve to support the transmission.

In the case illustrated, the outer support engaging ends of the mounting plate are bolted and secured to inwardly projecting flanges 13 of vertically extending angle iron brackets 14, which brackets are themselves bolted or otherwise secured to the inner sides of the stringers 12.

The construction further includes front and rear housing sections F and R. The front section F is a rearwardly opening, shell-like casting having a front end wall 20 with a substantially flat, vertical upper portion X and a flat, downwardly and forwardly inclined lower portion Y; a rearwardly projecting side wall 21 about the perimeter of the front wall and having substantially arcuate top and bottom portions 22 and 23 and straight, vertical side portions 24. The side wall 21 projects rearwardly and terminates on a flat, vertical plane and is provided with an outwardly projecting mounting flange 25 about its perimeter, which flange has a flat rear surface, flush with the rear end of the side wall and cooperating therewith to define a flat rearwardly disposed gasket engaging sealing surface 26 at the rear end of the section.

The flange 25 is provided with a plurality of axially extending, bolt-receiving openings spaced about its perimeter which openings register with spaced bolt-receiving openings in the plate P, about the primary and secondary apertures 10 and 11 therein.

In addition to the foregoing, the housing section F is provided with a partition 27 in its upper portion, which partition is in the nature of an arcuate inner wall projecting rearwardly from the front wall in spaced relationship from the top and side portions of the side wall 21. The partition 27 has laterally outwardly turned lower end portions which join the side wall and has a flat, rear sealing surface in a common plane with the surface 26 of the housing.

The partition 27 serves to define a water jacket about the upper portion of the housing section, in and through which cooling water can be circulated to cool the construction when it is in operation.

The section F further includes forwardly opening inlet and outlet openings in the front end wall 20, communicating with the water jacket J and in which suitable fluid conducting fittings are engaged. Alternately, the rear wall of the rear setcion may be provided with such openings and fittings, as indicated at 29 in FIG. 3 of the drawings.

Still further, the section F is provided with upper and lower annular bosses 30 and 30' in the upper and lower portions X and Y of the front end wall, which bosses define straight, axially extending, cylindrical bores or openings 31 and 31' and flat, annular, forwardly disposed stop surfaces 32 and 32'. Each boss is provided with circumferentially spaced fastener receiving openings 33.

The primary opening 10 in the plate P corresponds in size and extent with the interior cross section of the housing section F defined by the partition 27 and the portions of the side wall 21 below the ends of the partition, while the secondary opening 11 in the plate P is an arcuate slotlike opening and corresponds in size, shape and extent with the cavity defined by the jacket J, which cavity is defined by the partition and the portions of the side wall above the ends of the partition.

The rear housing section R is similar to the front housing section F except that it is reversed to open forwardly instead of rearwardly and the lower portion Y' of the end wall is inclined forwardly and downwardly.

Those parts and/or portions of the housing section R which are the same or similar as the parts and portions of the housing F are: the rear end wall 20' (except for the noted and above indicated change in the angle of inclination of the lower portion Y' relative to the upper portion X'), the forwardly extending side wall 21$^a$ with its portions 22$^a$, 23$^a$ and 24$^a$, the flange 25$^a$, the forwardly disposed sealing surface 26$^a$, the bolt receiving openings in the flange (not shown), the forwardly projecting partition 27$^a$ which cooperates to define the jacket J, and the annular bosses 30$^a$, with their bores 31$^a$ and rearwardly disposed stop surfaces 32$^a$, and fastener receiving openings 33$^a$, in the upper and lower portions X' and Y' of the rear end wall.

In the preferred carrying out of the invention, the housing sections F and R are, as illustrated, provided with outwardly projecting heat transfer or cooling veins V about their exterior.

Suitable gaskets G and G' are provided for the sealing surfaces 26 and 26$^a$.

The rear section R, with its gasket G' is arranged adjacent the flat, rear surface of the plate P, with the bolt receiving openings in the plate and section in register with each other. Suitable bolts 40 are engaged through the registering openings, from the rear end of the construction, which bolts project forwardly from the plate P a sufficient distance to subsequently project through and forward from the bolt-receiving openings in the flange of the front section F.

In practice, the bolt receiving openings in the mounting plate P can be threaded and the bolts advanced therein and therethrough so as to draw the section R into tight clamped and sealing engagement with the plate and so that the forward ends of the bolts are in the nature of forwardly projecting studs on the mounting plate P.

The front section F and its gasket G are are arranged adjacent the flat front surface of the mounting plate P and are engaged on the studs or the forwardly projecting ends of the bolts 40.

Suitable nuts 41 are engaged on the forwardly projecting free ends of the bolts and are advanced rearwardly into engagement with the flange 25 to urge and hold the section F in tight clamped and sealing engagement with the plate P.

Related to and carried by the upper annular boss 30 of the front section F is a substantially flat, disc-shaped front carrier plate 45 which plate establishes flat bearing and sealing engagement on the stop surface 32 of the boss with which it is related, and is provided with a plurality of circumferentially spaced, fastener receiving openings 46 to register with the openings 33 in the boss. Suitable bolts or screw fasteners 47 are engaged through the openings 47 and into the openings 33 to releasably hold the plate in tight clamped and fixed position in or to the boss.

The plate 45 is provided with a rearwardly projecting annular skirt 48, which skirt slidably enters the bore 31 and cooperates with the plate to define a rearwardly opening, bearing receiving socket 49.

The forward or inner end portion of the skirt is provided with an annular, radially inwardly opening snap ring receiving channel or groove 50. The carrier plate receives and carries an anti-friction ball bearing 51. The ball bearing 51 has an outer annular race ring 52 which is slidably engaged and seated in the socket 49, an inner annular race ring 53 and an annular row of ball bearings 54 between the races.

The bearing 51 is retained in the socket by means of a snap ring 55 engaged in the groove 50 and engaging the inner or rear end of the outer race ring 52.

The bore 31′ defined by the lower boss 30′ of the front section F is smaller in diameter than the bore 31 defined by the upper boss and is provided with a radially inwardly projecting annular stop flange 56 at its inner end.

An anti-friction ball bearing 51′ with inner and outer race rings 52′ and 53′ and an annular row of balls 54′ between the rings is arranged in the boss with its outer ring 53′, press-fitted in the bore and stopped against the flange 56.

Arranged in and with the inner race ring 52′ is an extractor 60. The extractor is a sheet metal part having a rearwardly opening central shaft receiving cup 61 slidably engaged in the inner race 52′ and a radially outwardly projecting flange 62 at its open rear end and engaging the rear end of the inner race ring 52′. The bottom 63 of the extractor is provided with a central threaded opening 64 to receive a jack screw 65, as illustrated in FIG. 5 and as will hereinafter be described.

The construction further includes a lower, substantially flat, disc-shaped retainer plate 45′ which plate establishes flat bearing and sealing engagement on the stop surface 32′ of the lower boss 31′ and is provided with a plurality of circumferentially spaced fasteners receiving openings 46′ which register with the openings 33′ in the boss. Suitable screw fasteners 47′ are engaged through the opening 46′ and into the openings 33 to releasably hold the plate in clamped fixed position on the boss.

In practice, the central portion of the plate can, as illustrated, be formed to accommodate the forward portion of the extractor.

The extractor is normally pressed or snug fitted in and with the inner race ring 52′ of the bearing, as illustrated.

The bosses 30ª of the rear section R, like the boss 30′ of the front section F, are provided with stop flanges 56ª at their inner ends.

Related to each annular boss 30ª of the rear section is a substantially flat, disc-shaped retainer plate 45ª, which plate establishes flat bearing and sealing engagement on the stop surface 32ª of the boss and is provided with a plurality of circumferentially spaced fastener receiving openings 46ª which register with the openings 33ª in the boss. Suitable screw fasteners 47ª are engaged through the openings 46ª and into the openings 33ª to releasably hold the plate in fixed position in and on the boss.

Each plate 45ª is provided further with a central rearwardly opening shaft receiving opening 57 to freely receive a related shaft. The inner end of the opening is provided with an annular axially and radially inwardly opening groove 58 in which a suitable annular oil seal 59 is engaged.

Each boss 30ª receives and carries an anti-friction ball bearing 51ª. The ball bearing 51ª has an outer annular race 52ª which is press fitted in the bore 31ª and stopped against the flange 56ª, an inner annular race 53ª and an annular row of ball bearings 54ª between the races.

The bearing 51ª is retained or kept in the socket by the retainer plate 45ª.

The inner race ring 53ª overlies the outer peripheral portion of the forwardly opening end or side of the groove 58 and occurs adjacent the outer peripheral portion of the forward end of the seal 59 to maintain the seal in place in the groove 58.

The upper, front and rear carrier and retainer plates carried by the upper portions X and X′ of the housing sections F and R are arranged and disposed so that the bearings 51 and 51ª related thereto are in axial alignment and in predetermined spaced relationship with each other.

The lower front and rear retainer plates carried by the lower portions Y and Y′ of the sections F and R are also related to the housing sections and to each other so that the bearings 51′ and 51ª related thereto are in axial alignment and in predetermined axial spaced relationship.

The carrier plate 45 with its related bearing 51 is and may be referred to as releasable bearing means, while the bearing 51′ with its related extractor 60 may be referred to as a releasable bearing means. The bearings 51ª are fixed bearing means.

In addition to the foregoing, the construction further includes input and output shafts I and O.

The input shaft I is an elongate horizontally extending unitary member related to the upper portions of the housing sections and their related releasable bearing means.

The shaft I has a central cylindrical portion 70 to occur within the housing and to extend between the upper front and rear bearings means. The portion 70 has a longitudinally extending radially outwardly opening spline 71 and a radially outwardly projecting flange-like enlargement 72 at its rear end, which enlargement establishes an annular forwardly disposed stop shoulder 73 and an annular rearwardly disposed stop shoulder 74.

The stop shoulder 74 engages and stops against the forward end of the inner race ring 53ª of the upper rear bearing 51ª.

The shaft also includes axially extending front and rear support portions 75 and 76, of reduced diameter and of limited axial extent. The support portions slidably enter and project through the inner race rings 53 and 53ª of the upper front and rear bearing means to be rotatably supported and carried thereby.

Finally, the shaft I includes a rearwardly projecting rear end portion 77 projecting rearwardly from the support portion 76, through the seal 59 and the opening 57 in the upper rear carrier plate.

The portion 77 is of slightly reduced diameter, is provided with a key-way 78 and is adapted to be suitably connected or coupled with the forwardly projecting drive shaft 79 of an engine E in the rear of the boat or craft C with which my transmission is related.

Engaged on the central portion 70 of the shaft I is a drive gear 80. The drive gear 80 is a straight, spur-type gear with a central, splined shaft receiving opening 81. The gear is slidably engaged on the splined portion shaft from its forward end and is moved rearwardly into butted stopped engagement against the shoulder 73.

In addition to the foregoing, an annular spacer ring or sleeve 85 is slidably engaged about the central portion of the shaft forward of the gear 80, which sleeve extends between the front side of the gear and the rear end of the inner race ring 53 of the upper bearing means.

The sleeve 85 holds the gear 80 against the shoulder 73 on the shaft and in predetermined axial placement on the shaft and within the construction.

The output shaft O is similar to the input shaft I and, like the input shaft, has a splined central portion 70′, an enlargement 72′ defining shoulders 73′ and 74′. The shaft O further includes support portions 75′ and 76′ and an end portion 77′ with a slot 78′ therein.

The shaft O is engaged with its related lower, front and rear bearing means in the same manner as the shaft I is related to its related bearing means.

It will be apparent that the forward end of the shaft O, rather than being engaged directly in the inner race 53′ of its related bearing, is engaged in the cup portion 61 of the extractor 60.

The shaft O is arranged below the shaft I and is downwardly and rearwardly inclined relative thereto.

Arranged on the central portion 70′ of the shaft O is a driven gear 80′. The driven gear 80′ is a bevel gear with a central, splined shaft receiving opening 81 and like the gear 80 is slidably engaged on its related shaft from the forward end thereof and into butted engagement on its related shaft shoulder 73'. The gear 80' is meshed with the gear 80.

A spacer ring or sleeve 85' is slidably engaged about the central portion 70' of the shaft O, forward of the driven gear 80'. The ring or sleeve 85' extends between the gear 80' and the flange 62 of the extractor and holds them in clamped engagement on the inner race ring 53'.

In practice, the inner race rings or shaft bearings in the ordinary or conventional V-drive transmissions are press-fitted onto the shafts. While such snug or press fits are necessary to prevent play, they ordinarily prevent easy and quick dis-assembly of such constructions.

In the instant invention, the rear support portions 70 and 70' of the shaft I and O are engaged with their related bearings in a conventional manner and as set forth above, that is, they are press fitted therein and cannot be readily removed.

The forward support portions 75 and 75' of the shafts, however, are not press fitted in their related bearing means, but instead the portions 75 and 75' are slidably engaged in their related inner race ring and extractor to establish a snug fit, but such that the bearings can be easily shifted axially forwardly and out of engagement with the shafts.

To prevent undesired working and/or play between the forward support portions of the shafts and the race ring 53 and extractor 60, the said support portions are provided with annular radially outwardly opening grooves 90 in which resilient rubber O-rings 91 are engaged. The O-rings 91 normally project outwardly from the grooves and are substantially equal in cross-sectional extent with the cross-sectional area of the grooves. Accordingly, when the shafts are engaged in the ring 53 and extractor, the O-rings are compressed, to a substantially solid state, and serves to effectively yieldingly and frictionally hold the shafts and related ring 53 and extractor 60 assembled and against undesired relative working and the like.

The rear end 77' of the output shaft O is suitably coupled with a propeller shaft S, which shaft is related to the craft C in a conventional manner.

With the construction described above, it will be apparent that I provide an extremely simple, rugged, practical transmission.

When it is desired to change or alter the gear ratio of my transmission, one of the front bearing means is removed from engagement with its related shaft.

In the case illustrated in FIG. 4, I have shown the upper front carrier plate or bearing means removed.

Removal of the carrier plate or bearing means is effected by simply removing the several (six) fasteners 47 and pulling the plate axially forwardly.

With the carrier plate removed and the forward end of the shaft related thereto free and no longer held captive by the bearing means, the nuts 41 are removed from the forward ends of the studs or bolts 40.

With the nuts 41 removed, the front housing section F is shifted axially forwardly along the access of the lower shaft and until the lower forward bearing means is disengaged from the output shaft.

When the front housing F and front bearing means are removed from engagement with the remainder of the construction, it will be apparent that the housing is fully opened and the forward ends of the shafts I and O are free and exposed.

Next, the spacer rings 85 and 85' are slid from engagement on their related shafts.

Next, the upper drive gear 80 is slid or shifted forwardly from engagement on the shaft I and, finally, the lower driven gear 80' is slid or shifted forwardly from engagement on the shaft O.

It is important to note that the drive gear 80 must be removed first, as should it be attempted to remove the driven gear 81 first, it would bind on and with the drive gear and its removal would be prevented.

It will be apparent that a new set of gears 80 and 80' can be easily, conveniently and quickly installed and that the construction can be quickly and easily re-assembled by simply reversing the above procedure.

Still further, it will be apparent that in order to effect a change of gears in the manner set forth above, only two assemblies need be removed, that is, the carrier plate assembly (or upper forward bearing means) and the front housing section F with the other plate and bearing means related to it. These two assemblies need not be dis-assembled. The remaining parts and/or portions of the construction need not be tampered with and the shafts need not be disconnected or otherwise tampered with.

The fact that the remainder of the construction need not be tampered with or otherwise worked upon and the fact that the shafts need not be pulled or disconnected is highly important as changing the gears will in no way affect or upset the set or alignment of the transmission with the engine and propeller shafts, which alignment is critical, time-consuming and difficult to establish.

It is to be noted that in the specific case illustrated, only ten nuts and six bolts or screw fasteners need be released to effect the change of gears. This can be accomplished in a matter of a few minutes without the exercise of any special skill.

In another carrying out of the invention and as illustrated in FIG. 5 of the drawings, when it is desired to change gears or otherwise work on the transmission, the lower retainer plate 45' is removed.

Next, a jack bolt 65 is engaged in the opening 64 in the extractor 60. The bolt 65 can be one of the bolts 47'. The bolt is advanced to engage the adjacent end of the shaft O and jacks the extractor and its related bearing 51' axially forwardly and out of engagement within the boss.

When the bearing 51' is thus removed, the housing is shifted axially forwardly relative to the input shaft I and the structure is opened in the same or similar manner as set forth above.

It will be apparent that the means and method of opening the construction set forth above and illustrated in FIG. 5 is substantially as quick, easy and effective as the previous method illustrated in FIG. 4 of the drawings and previously considered.

It will be apparent that the lower forward bearing means could, if desired, be the same as the rear bearing means. Further, it will be apparent that the lower forward bearing means could, if desired, be the same as the upper forward bearing means, in which case the upper forward bearing means could be as illustrated or could be the same as one of the other bearing means provided.

In any one of the above combinations, it will be apparent that the construction would be such that it could be quickly and effectively worked upon in the manner desired and as set forth above.

In light of the above, it will be apparent that I have, in fact, disclosed two forms of forward bearing means, each of which can be substituted for the other and any one of which need be provided to gain the desired end, that is, a quick change V-drive transmission.

In practice, an oil drain port 90 with a threaded plug 91 can be provided at the bottom of the housing section F as illustrated in FIG. 4 of the drawings. Further, an oil receiver and oil level port, with a suitable plug, can be provided in the front end wall of the housing section F as indicated in dotted lines in FIG. 3 of the drawings.

It is to be understood that, in practice, the lowermost fasteners 47 on the upper carrier plate 45 and the uppermost fastener 47' on the lower plate 45' are in fact spaced apart sufficiently to allow or permit easy access thereto and engagement thereof. The apparent close and/or interfering relationship of these two fasteners, illustrated in the drawings, is shown for the purpose of better illustrating other details of the construction. In practice, rotation of the pattern of fastener receiving openings, 15° in one of the forward bosses, corects this apparent problem.

With my new construction, a skilled mechanic, familiar with the construtcion, can effect a change of gears in approximately ten minutes, which task in the ordinary or conventional V-drive transmission, requires many hours of skilled labor.

Having described typical preferred forms and applications of my invention, I do not wish to be limited or restricted to the specific details herein but wish to reserve to myself any modifications or variations that may appear to those skilled in the art and which fall within the scope of the following claims:

Having described my invention, I claim:

1. A V-drive transmission of the character referred to including, an elongate transversely extending vertical mounting plate having flat front and rear surfaces, an axially forwardly and rearwardly opening aperture, a plurality of axially extending bolt-receiving openings through the plate and about the aperture, a forwardly opening shell-like rear housing section arranged adjacent the rear surface of the plate in register with said aperture and having bolt-receiving openings to register with the openings in the plate, and having a rear end wall with a vertical top portion and a downwardly and forwardly inclined lower portion, a rearwardly opening shell-like front housing section arranged adjacent the front surface of the plate in register with said aperture and having bolt-receiving openings to register with the openings in the plate and having a front end wall with vertical top portion and a downwardly and forwardly inclined lower portion, pairs of axially aligned openings in the top portions of the front and rear end walls and in the lower portions of the front and rear end walls, bearings fixed in the openings in the rear end wall, an upper, horizontal in-put shaft carried by and extending through the bearing in the opening in the top section of the rear end wall and terminating at the opening in the top portion of the front end wall, a lower upwardly and forwardly inclined output shaft carried by and extending through the bearing in the lower portion of the rear end wall and terminating at the opening in the lower portion of the front end wall, a drive gear slidably engaged on the in-put shaft against axial rearward shifting and rotation, a gear slidably engaged on the out-put shaft against axial rearward shifting, said drive and driven gears being meshed with each other, front bearing means engaged in the openings in the front end wall and slidably receiving and rotatably supporting the forward ends of the shafts related thereto, spacer sleeves on the shafts between the gears and the front bearing means, screw fastener means releasably securing one of said front bearing means to the front housing section, and screw fastener means engaged through the registering openings in the sections and the mounting plate and releasably holding the front section on the the plate and holding the plate and rear section in tight clamped engagement with each other.

2. A construction as set forth in claim 1 wherein said shafts and gears are splined and said shafts have forwardly disposed, annular stop shoulders against which the gears are held in stopped position by the spacer sleeves.

3. A structure as set forth in claim 1 wherein said shafts have rearwardly disposed stop shoulders stopped against the bearings in the openings in the rear end wall, said shafts and gears are splined and said shafts have forwardly disposed, annular stop shoulders against which the gears are held in stopped position by the spacer sleeves.

4. A structure as set forth in claim 1 wherein said screw fastener means includes bolts with shank portions threadedly engaged through the openings in the mounting plate, heads on the rear ends of the shanks engaging the rear section and nuts engaged on the front ends of the shanks engaging the front sections.

5. A structure as set forth in claim 1 wherein said mounting plate has end portions projecting laterally from the opposite sides of the sections adapted to be fixed to a related support structure.

6. A structure as set forth in claim 1 wherein said front bearing means includes a front carrier plate with a central rearwardly opening bearing receiving socket engaged in one of the openings in the front end wall, and outer friction bearing engaged in the socket and slidably receiving and rotatably supporting the forward end of the shaft related thereto, an anti-friction bearing fixed in the other opening in the front wall and engaging and supporting the forward end of the shaft related thereto, spacer sleeves on the shafts between the gears and the front bearings, screw fastener means releasably securing said carrier plate to the front housing section, and nuts engaged on the shanks and releasably holding the sections and the plate in tight clamped engagement with each other.

7. A V-drive transmission of the character referred to including, an elongate transversely extending vertical mounting plate having flat front and rear surfaces, an axially forwardly and rearwardly opening aperture, a plurality of axial extending bolt-receiving openings through the plate and about the aperture, a forwardly opening shell-like rear housing section arranged adjacent the rear surface of the plate in register with said aperture and having bolt-receiving openings to register with the openings in the plate, and having a rear end wall with a vertical top portion and a downwardly and forwardly inclined lower portion, pairs of axially aligned openings in the top portions of the front and rear end walls and in the lower portions of the front and rear end walls, bearings fixed in the openings in the rear end wall, an upper, horizontal in-put shaft carried by and extending through the bearing in the opening in the top portion of the rear end wall and terminating at the opening in the top portion of the front end wall, a lower upwardly and forwardly inclined out-put shaft carried by and extending through the bearing in the lower portion of the rear end wall and terminating at the opening in the lower portion of the front end wall, a drive gear slidably engaged on the in-put shaft against axial rearward shifting and rotation, a gear slidably engaged on the out-put shaft against axial rearward shifting, said drive and driven gears being meshed with each other, front bearing means engaged in the openings in the front end wall and slidably receiving and rotatably supporting the forward ends of the shafts related thereto, spacer sleeves on the shafts between the gears and the front bearing means, and screw fastener means engaged through the registering openings in the sections and the mounting plate and releasably holding the front section on the plate and holding the plate and rear section in tight clamped engagement with each other.

8. A structure as set forth in claim 7 wherein, one of said front bearing means includes a carrier plate engageable on the front wall to overlie the opening related thereto, a forwardly projecting annular skirt on the plate slidably engaged in the opening and defining a socket, a bearing fixed in the socket and slidably receiving and rotatably supporting the forward end of the shaft related thereto, and screw fasteners releasably securing the plate to the housing section.

9. A structure as set forth in claim 7 wherein said other bearing means includes an outer bearing race press fitted in the other opening, an inner bearing race and a row of balls between the races, an extractor related to one of said other bearing means and including a rearwardly opening cup slidably engaged in the inner race and slidably receiving the shaft related thereto, a radially outwardly projecting flange at the forward end of the cup and engaging the front end of the inner race, a central threaded opening in the bottom of the cup and a jack screw releasably engaged through the central opening and engageable with the end of the shaft; and a retainer plate releasably fixed to the front section to overlie the opening and retain the bearing.

10. A structure as set forth in claim 7 wherein said bearing means includes an outer bearing race press fitted in the openings, inner bearing race and a row of balls between the races, an extractor related to one of said bearing means and including a rearwardly opening cup slidably engaged in the inner race and slidably receiving the shaft related thereto, a radially outwardly projecting flange at the forward end of the cup and engaging the front end of the inner race, a central threaded opening in the bottom of the cup and a jack screw releasably engaged through the central opening and engageable with the end of the shaft; and plates releasably fixed to the front section to overlie the openings and retain the bearing means.

References Cited

UNITED STATES PATENTS

| | | | |
|---|---|---|---|
| 1,548,917 | 8/1925 | Vincent | 74—417 X |
| 2,130,125 | 9/1938 | Fromm | 74—417 X |
| 2,282,612 | 5/1942 | Schultz | 74—417 X |
| 2,445,828 | 7/1948 | Heinsohn | 74—417 X |
| 2,750,806 | 6/1956 | Hobbs | 74—417 |
| 2,981,373 | 4/1961 | Van Ranst | 74—417 X |

HENRY F. RADUAZO, *Primary Examiner.*

L. H. GERIN, *Assistant Examiner.*